(No Model.)
J. H. HANNAY.
HANSOM CAB.
No. 370,697. Patented Sept. 27, 1887.
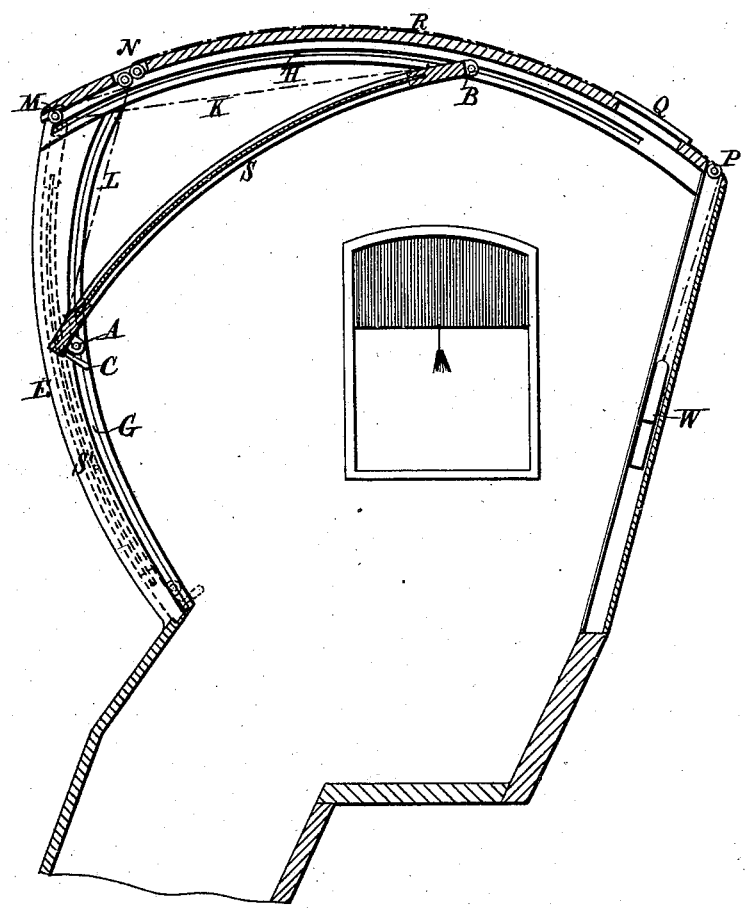
Witnesses.
Geo. W. Rea.
Robt. Everitt.
Inventor,
James H. Hannay.
By James L. Norris
Atty.
N. PETERS. Photo-Lithographer, Washington, D. C.

UNITED STATES PATENT OFFICE.

JAMES HENRY HANNAY, OF PORCHESTER TERRACE, COUNTY OF MIDDLESEX, ENGLAND.

HANSOM-CAB.

SPECIFICATION forming part of Letters Patent No. 370,697, dated September 27, 1887.

Application filed April 28, 1887. Serial No. 236,521. (No model.) Patented in England February 11, 1887, No. 2,181.

*To all whom it may concern:*

Be it known that I, JAMES HENRY HANNAY, a citizen of England, residing at Porchester Terrace, in the county of Middlesex, England, have invented a new and useful Improvement in Hansom-Cabs and Such Like Vehicles, of which the following is a specification.

My invention relates to the construction and mounting of the window of a hansom-cab or such like vehicle in such a manner that a single sash without jointing can be raised and lowered freely, either by the passenger or by the driver, without in any way interfering with the convenience of the passenger.

I will describe my invention, referring to the accompanying drawing, which is a vertical section of so much of a hansom-cab as is necessary to illustrate the construction which I adopt for this purpose, the window being shown in an intermediate position.

I make the sash S as a glazed frame curved to suit the arch of the roof R of the vehicle, beneath which the sash lies when it is drawn up. I also form the sides of the cab with their front edges, E, of corresponding curvature. In each side of the cab I form a curved groove, G, and just under the roof another curved groove, H, and on each edge of the sash I fix near its lower angle a stud, A, and at its upper angle a stud, B, the stud A projecting into and traveling along the groove G and the stud B projecting into and traveling along the groove H. By means of a handle, C, the passenger can push up the sash S, causing it to take a position lying horizontally overhead immediately under the roof R; or he can push it down to the position indicated by the dotted lines S', standing nearly vertical and closing the front of the cab from the roof down to the doors. To facilitate movement, the studs A and B may have on them anti-friction rollers running in the grooves.

In order that the driver, seated behind, may work the window, I attach to the upper and lower edges of the sash cords K and L, and lead them over guide-pulleys M N, over the roof R, over a guide-pulley, P, to two separate weights, W, that are free to move up or down in the hollow casing of the cab-body. One of the cords as it passes along the roof may be carried obliquely at one side of the door Q and the other cord at the other side of the door, leaving the door free to be opened and closed. The driver by pulling the cord K can lower the sash, and by pulling the cord L he can raise it.

Having thus described the nature of my invention and the best means I know for carrying the same into practical effect, I claim—

A hansom-cab or similar vehicle having its roof R provided with a guide-groove, H, and with guide-grooves G extending vertically from the roof downward at the side of the vehicle, and a sash, S, having its upper portion provided with a lateral stud, B, to travel in the groove H, and at its lower edge with lateral studs A, to travel in the vertical grooves G, substantially as shown and described.

In testimony whereof I have signed my name to this specification, in the presence of two subscribing witnesses, this 15th day of April, A. D. 1887.

JAMES HENRY HANNAY.

Witnesses:
 OLIVER IMRAY,
*Patent Agent, 28 Southampton Buildings, London, W. C.*
 JNO. P. M. MILLARD,
*Clerk to Messrs. Abel & Imray, Consulting Engineers and Patent Agents, 28 Southampton Buildings, London, W. C.*